(12) United States Patent  
Schwarz et al.

(10) Patent No.: US 10,290,152 B2  
(45) Date of Patent: May 14, 2019

(54) VIRTUAL OBJECT USER INTERFACE DISPLAY

(71) Applicant: Microsoft Technology Licensing, LLC, Redmond, WA (US)

(72) Inventors: Julia Schwarz, Redmond, WA (US); Bo Robert Xiao, Pittsburgh, PA (US); Hrvoje Benko, Seattle, WA (US); Andrew Wilson, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 58 days.

(21) Appl. No.: 15/478,107

(22) Filed: Apr. 3, 2017

(65) Prior Publication Data

US 2018/0286126 A1    Oct. 4, 2018

(51) Int. Cl.
| | |
|---|---|
| *G06T 19/00* | (2011.01) |
| *G06F 3/0484* | (2013.01) |
| *G06F 3/0481* | (2013.01) |
| *G06F 3/0488* | (2013.01) |
| *G06F 3/01* | (2006.01) |

(52) U.S. Cl.
CPC .......... *G06T 19/006* (2013.01); *G06F 3/011* (2013.01); *G06F 3/0488* (2013.01); *G06F 3/04815* (2013.01); *G06F 3/04845* (2013.01)

(58) Field of Classification Search
CPC .................................................. G06T 19/006
See application file for complete search history.

(56) References Cited

U.S. PATENT DOCUMENTS

| | | | |
|---|---|---|---|
| 7,701,439 B2 | 4/2010 | Hillis et al. | |
| 7,843,449 B2 | 11/2010 | Krah | |
| 9,236,000 B1 | 1/2016 | Worley | |
| 9,248,388 B1* | 2/2016 | Jensen | B01D 17/0214 |
| 9,384,594 B2 | 7/2016 | Maciocci et al. | |
| 2002/0057280 A1* | 5/2002 | Anabuki | G02B 27/017 345/633 |

(Continued)

FOREIGN PATENT DOCUMENTS

WO    2007097644 A2    8/2007

OTHER PUBLICATIONS

Langhans, K. et al., "FELIX 3D Display: An Interactive Tool for Volumetric Imaging," In Proceedings of SPIE vol. 4660, Stereoscopic Displays and Virtual Reality Systems IX, Jan. 20, 2002, San Jose, California, 15 pages.

(Continued)

*Primary Examiner* — Ryan R Yang  
(74) *Attorney, Agent, or Firm* — Alleman Hall Creasman & Tuttle LLP

(57) ABSTRACT

Methods, computing devices and head-mounted display devices for displaying user interface elements with virtual objects are disclosed. In one example, a virtual object and one or more user interface elements are displayed within a physical environment. User input is received that moves one or more of the virtual object and the one or more user interface elements. One or more of the virtual object and the one or more user interface elements are determined to be within a predetermined distance of a physical surface. Based at least on this determination, the one or more user interface elements are displayed on the surface.

20 Claims, 10 Drawing Sheets

(56) References Cited

U.S. PATENT DOCUMENTS

| | | | |
|---|---|---|---|
| 2004/0046711 | A1 | 3/2004 | Triebfuerst |
| 2010/0245387 | A1 | 9/2010 | Bachelder et al. |
| 2012/0113223 | A1 | 5/2012 | Hilliges et al. |
| 2012/0169854 | A1 | 7/2012 | Seo et al. |
| 2012/0223909 | A1 | 9/2012 | Tse et al. |
| 2012/0249741 | A1* | 10/2012 | Maciocci ............... G06F 3/011 348/46 |
| 2013/0044128 | A1* | 2/2013 | Liu ......................... G09G 5/00 345/633 |
| 2013/0335303 | A1 | 12/2013 | Maciocci et al. |
| 2014/0078176 | A1* | 3/2014 | Kim ....................... G06F 3/017 345/633 |
| 2014/0333666 | A1* | 11/2014 | Poulos ................ G06T 19/006 345/633 |
| 2016/0004306 | A1 | 1/2016 | Maltz |
| 2016/0155270 | A1 | 6/2016 | Poulos et al. |
| 2016/0189426 | A1* | 6/2016 | Thomas ............... G06T 19/006 345/633 |
| 2017/0337742 | A1* | 11/2017 | Powderly ............... G06F 3/012 |

OTHER PUBLICATIONS

Piekarski, W. et al., "Augmented Reality Working Planes: A Foundation for Action and Construction at a Distance," In Proceedings of the Third IEEE and ACM International Symposium on Mixed and Augmented Reality (ISMAR 2004), Nov. 2, 2004, Arlington, Virginia, 10 pages.

Xue, D. et al., "A New 3D Display Using a Dynamically Reconfigurable Display Matrix Surface," In Proceedings of Computer Graphics International 2005 (CGI'05), Jun. 22, 2005, Stony Brook, New York, 8 pages.

Otsuka, R. et al., "Transpost: A Novel Approach to the Display and Transmission of 360 Degrees-Viewable 3D Solid Images," IEEE Transactions on Visualization and Computer Graphics, vol. 12, No. 2, Mar. 2006, Published Online Jan. 10, 2006, 8 pages.

Waugh, R., "Holograms invade your home: New games could project 3D worlds into your living room," Daily Mail Website, Available Online at www.dailymail.co.uk/sciencetech/article-2038127/Holograms-invade-home-new-games-project-jungle-living-room.html#axzz2KNCSiihv, Sep. 16, 2011, 10 pages.

ISA European Patent Office, International Search Report and Written Opinion Issued in PCT/US2014/037614, dated Mar. 31, 2015, WIPO, 12 pages.

Sato, et al., "An AR system on manipulating a virtual object with a bare hand", In Proceedings of SIGGRAPH ASIA Posters, Dec. 5, 2016, 1 page.

Otsuki, et al., "Touch & detach: physics-based unbinding and observation of complex virtual objects in 3d space", In Proceedings of Extended Abstracts on Human Factors in Computing Systems, May 5, 2012, pp. 1661-1666.

"International Search Report & Written Opinion Issued in PCT Application No. PCT/US2018/024692", dated Jun. 20, 2018, 10 Pages.

* cited by examiner

VIRTUAL OBJECT USER INTERFACE DISPLAY

BACKGROUND

Augmented reality display devices enable users to view and manipulate virtual content that is displayed to appear within the users' physical environment. In some examples, virtual content may be accompanied by one or more virtual user interface elements, such as one or more holographic buttons, sliders or other control elements, that may be used to interact with the content.

SUMMARY

Methods, computing devices and head-mounted display devices for displaying user interface elements are disclosed herein. In one example, a method comprises displaying a virtual object within a real world physical environment, and displaying one or more user interface elements with the virtual object. User input is received that moves one or more of the virtual object and the one or more user interface elements.

The method determines that one or more of the virtual object and the one or more user interface elements are within a predetermined distance of a physical surface in the environment. Based on determining that one or more of the virtual object and the one or more user interface elements are within the predetermined distance of the surface, the one or more user interface element are displayed on the surface.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
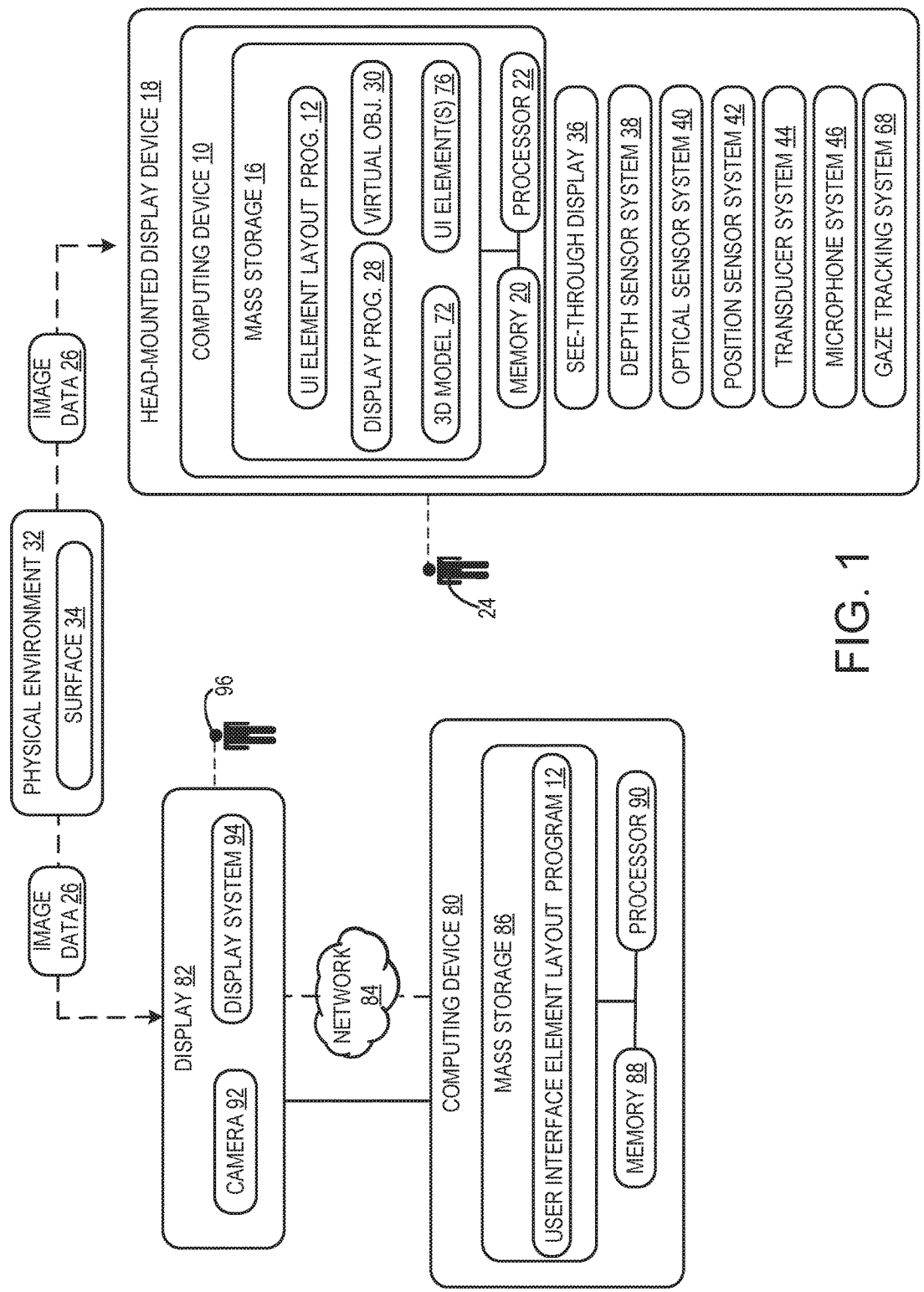
FIG. 1 is a schematic view of example computing devices and display devices that may display user interface element(s) according to examples of the present disclosure.

In an augmented reality environment, a user may view a real world physical environment that includes virtual content, such as holograms, displayed within the physical environment. For example and as described in more detail below, a head-mounted display (HMD) device may include a see-through display configured to visually augment a view of a real world three dimensional environment through the display. In other examples, virtual content may be blended with real-world imagery of the user's real world environment. For example, a display device may comprise a non-see-through head-mounted display device that provides an immersive, virtual reality experience. In other examples, tablet computers, mobile communication devices, notebook computers, and similar devices may display virtual content that is blended with real-world imagery of the user's real world environment.

In some examples and as described in more detail below, virtual content may be displayed along with one or more user interface (UI) elements that may be selected by the user or otherwise interacted with to manipulate the virtual content. For example, a floating holographic object along with corresponding holographic UI elements may be displayed in front of a user (see, for example, the holographic motorcycle 244 and adjacent holographic UI elements 76 shown in FIG. 2). A user may conveniently interact with the holographic object by selecting one or more of the UI elements using one or a combination of input methods or modalities. Examples of such methods and modalities may include gaze detection, gesture detection, head pose detection, voice commands, mouse input, handheld controllers, and keypresses from a keyboard. For example, the user may gaze at a user interface element to select it, and then use finger gestures to manipulate the displayed object according to functionality associated with the selected UI element.

In examples where the holographic UI elements are displayed floating in the air, if the user physically moves her finger (or a hand-held pen, stylus, etc.) to "touch" one of the elements (i.e., co-locates her finger with the location of the displayed UI element), the user does not feel the haptic feedback on her fingertip that normally would be felt when touching a physical button or other physical surface. In other examples where a UI element is displayed on a physical surface, the user may physically "touch" one of the elements by moving her finger (or pen, stylus, etc.) to contact the surface on which the element is displayed. In this manner, the user may feel haptic feedback when the user perceives her finger/pen/stylus contacting the UI element. For purposes of the present disclosure, displaying a UI element or other virtual content on a physical surface comprises displaying the element to appear to be located on or attached to the surface.

The present disclosure is directed to methods, computing devices and display devices that display UI elements in locations that provide convenient user interaction experiences. In some examples and based on one or more factors, UI elements are moved from a floating location to being displayed on a physical surface. In some examples, an initial position of displayed UI element(s) may be programmatically modified to display the elements on a nearby surface in a modified position. In this manner, users may physically touch a portion of the surface on which the UI element is displayed. Accordingly, and in potential advantages of the present disclosure, the familiarity, intuitiveness, accuracy, and other benefits of a touch-based interaction experience are conveniently provided to the user.

With reference now to FIG. 1, a schematic view of example implementations of computing and display devices for displaying UI element(s) is provided. In one example a computing device 10 is integrated into a head-mounted display (HMD) device 18. Computing device 10 may include a user interface (UI) element layout program 12 comprising instructions that may be stored in mass storage 16. The user interface element layout program 12 may be loaded into memory 20 and executed by a processor 22 to perform one or more of the methods and processes described herein. Additional details regarding the components and computing aspects of the computing device 10 are described in more detail below with reference to FIG. 18.

The HMD device 18 may create and display to a first viewer 24 an augmented reality environment comprising virtual content. The HMD device 18 may include a display program 28 that generates such virtual content for display via the HMD device. The virtual content may include one or more visual elements in the form of virtual objects 30, such as three-dimensional (3D) holographic objects and two-dimensional (2D) virtual images, that are generated and displayed to appear located within a real world physical environment 32 viewed through the device. In this manner, the HMD device 18 may create an augmented reality environment that enables the viewer to perceive such virtual objects 30 as positioned within the physical environment 32 surrounding the viewer. As discussed in more detail below, the physical environment 32 may include physical objects having surfaces 34, such as planar surfaces, curved surfaces, etc.

In some examples the HMD device 18 may comprise an at least partially see-through display 36 that is supported in front of a user's eye or eyes, thereby giving the user a view of his or her surroundings. Any suitable display technology and configuration may be used to display images via the at least partially see-through display 36. For example, the at least partially see-through display 36 may be configured to enable a wearer of the HMD device 18 to view a physical, real-world object in the physical environment through one or more partially transparent pixels that are displaying a virtual object representation. The at least partially see-through display 36 may include image-producing elements such as, for example, a see-through Organic Light-Emitting Diode (OLED) display.

As another example, the HMD device 18 may include a light modulator on an edge of one or more at least partially see-through display panels. In this example, the panel(s) may serve as a light guide for delivering light from the light modulator to the eyes of a wearer. Such a light guide may enable a wearer to perceive virtual content located within the physical environment that the wearer is viewing. In other examples the display panels may utilize a liquid crystal on silicon (LCOS) display.

The HMD device 18 may include one or more sensors and related systems that receive physical environment data from the physical environment 32. For example, the HMD device 18 may include a depth sensor system 38 that generates depth image data. The depth sensor system 38 may include one or more depth cameras that capture image data 26 from the physical environment 32. In some examples the depth camera(s) may be an infrared time-of-flight depth camera. In other examples the depth camera(s) may take the form of a structured light depth camera. Any suitable depth tracking system and technology may be utilized.

In some examples the HMD device 18 may include an optical sensor system 40 that utilizes at least one outward facing sensor, such as an RGB camera, IR sensor or other optical sensor. The outward facing sensor may capture image data 26 in the form of color, IR or other light information from the physical environment 32. In some examples such image data 26 may be used by the processor 22 to detect movements within a field of view of the HMD device 18, such as gesture-based inputs or other movements performed by a wearer (e.g., a pinching of fingers, closing of a fist, pointing with a finger or hand, etc.), that indicate an action to be taken, a selection of a virtual object displayed via the HMD device 18, or other user input. In some examples, such image data 26 may be used to determine that a user touches a surface.

Data from the optical sensor system 40 also may be used by the processor 22 to determine direction/location and orientation data (e.g., from imaging environmental features) that enables position/motion tracking of the HMD device 18 in the real world physical environment 32. Such data also may be used to identify surfaces and/or measure one or more surface parameters of the physical environment 32, such as whether a surface is planar, curved, textured, etc.

The HMD device 18 may also include a position sensor system comprising one or more accelerometers, gyroscopes, inertial measurement units, head tracking systems, and/or other sensors for determining a position and/or orientation of the device. The relative position and/or orientation of the HMD device 18 relative to the physical environment 32 may be assessed so that virtual content may be accurately displayed in desired real-world locations with desired orientations.

In some examples, a 6 degree-of-freed (6DOF) position sensor system may be used to display virtual content in a world-locked manner. A world-locked virtual object, such as a hologram, appears to be fixed relative to real world objects viewable through the HMD device 18, thereby enabling a wearer of the HMD device to move around a real world physical environment while perceiving the virtual object as remaining stationary in a fixed location and orientation in the physical environment.

In other examples, the HMD device 18 may operate in a body-lock display mode in which one or more virtual objects may be displayed via the HMD device with body-locked positions. In a body-locked position, a holographic object appears to be fixed relative to the wearer of the HMD device 18, and the body-locked position of the holographic object appears to be moveable relative to real-world objects.

In some examples, and as described in more detail below, a first virtual object may be displayed in an object-locked manner with respect to a second virtual object and/or the HMD device. In these examples, the first and second virtual objects appear to be positionally associated with one another, such that movement of one object causes corresponding movement of the other object. In other words, a position of the first object relative to the second object remains fixed when one or both objects are moved.

The HMD device 18 may also include a transducer system 44 comprising one or more actuators that convert an electrical signal into another form of energy. In some examples, the transducer system 44 may include one or more speakers for providing audio feedback to a viewer. In other examples the transducer system 44 may include one or more tactile transducers for generating and providing haptic feedback to the viewer, such as vibrations. The HMD device 18 may also include a microphone system 46 and one or more microphones for receiving audio input from the physical environment.

Computing device 10 may receive gaze tracking data from a gaze tracking system 68 of the HMD device 18. In some examples, one or more inward-facing light sources and image sensors may collect image information that is used to measure gaze parameters of the user's eyes. Using this information, the processor 22 may execute instructions to determine a direction in which the user is gazing and/or an identity of a physical and/or virtual object at which the user is gazing. Using the gaze tracking data, the processor 22 may execute instructions to monitor the gaze location of a viewer within the physical environment 32 and relative to physical features and virtual content displayed within the physical environment. In other examples, any suitable gaze tracking technology may be utilized.

In some examples, a 3D model 72 of at least a portion of the physical environment 32 may be generated by HMD device 18 and utilized to display and manipulate virtual objects 30 within the physical environment. The 3D model may include surface reconstruction information that may be used to identify physical objects and features, such as surfaces 34, in the physical environment.

The example illustrated in FIG. 1 shows the computing device 10 integrated into the HMD device 18. It will be appreciated that in other examples the computing device 10 may be a separate component from the HMD device 18 that is communicatively coupled to the device. Additionally, many types and configurations of HMD devices 18 having various form factors may be used and are within the scope of the present disclosure. In some examples, one or more of the above-described sensor systems or other data gathering systems may be located externally to the HMD device 18.

With continued reference to FIG. 1, an example of a computing device 80 that is physically separated from a display device 82 is shown. In this example, the computing device 80 may comprise or be integrated into a separate device, such as a set-top box, gaming console, or other like device that does not include an integrated display.

The computing device 80 may be operatively connected with the display device 82 using a wired connection, or may employ a wireless connection via WiFi, Bluetooth, or any other suitable wireless communication protocol. For example, the computing device 80 may be communicatively coupled to a network 84. The network 84 may take the form of a local area network (LAN), wide area network (WAN), wired network, wireless network, personal area network, or a combination thereof, and may include the Internet. Additional details regarding the components and computing aspects of the computing device 80 are described in more detail below with reference to FIG. 18.

As with computing device 10, computing device 80 may include UI element layout program 12 that may be stored in mass storage 86. The UI element layout program 12 may be loaded into memory 88 and executed by a processor 90 to perform one or more of the methods and processes described in more detail below via display device 82.

The example display device 82 may include a camera 92 for capturing image data 26 of the physical environment 32 and a display system 94 for presenting visual content to a second viewer 96. In some examples, the display device 82 may include one or more of the sensor, transducer, microphone and gaze tracking systems of the HMD device 18 described above. In some examples, the display device 82 may comprise a non-see-through head-mounted display device that provides an immersive, virtual reality experience. In these examples, displaying a virtual object within a real world physical environment may comprise displaying the virtual object within a virtual representation of a real world physical environment, where virtual surfaces correspond to physical surfaces.

In other examples, the computing device 80 may comprise or be integrated into the display device 82, and may take the form of a tablet, notebook, mobile computing device, wall-mounted display, or other like device having an integrated display. In some examples, one or more external cameras and other sensors (not shown) may capture data regarding a position or orientation of the display device 82 and provide such data to the computing device 80. For example, one or more externally mounted depth cameras, RGB cameras and/or IR cameras may track a position and orientation of the display device 82 and provide such data to computing device 80.

Figure 2:
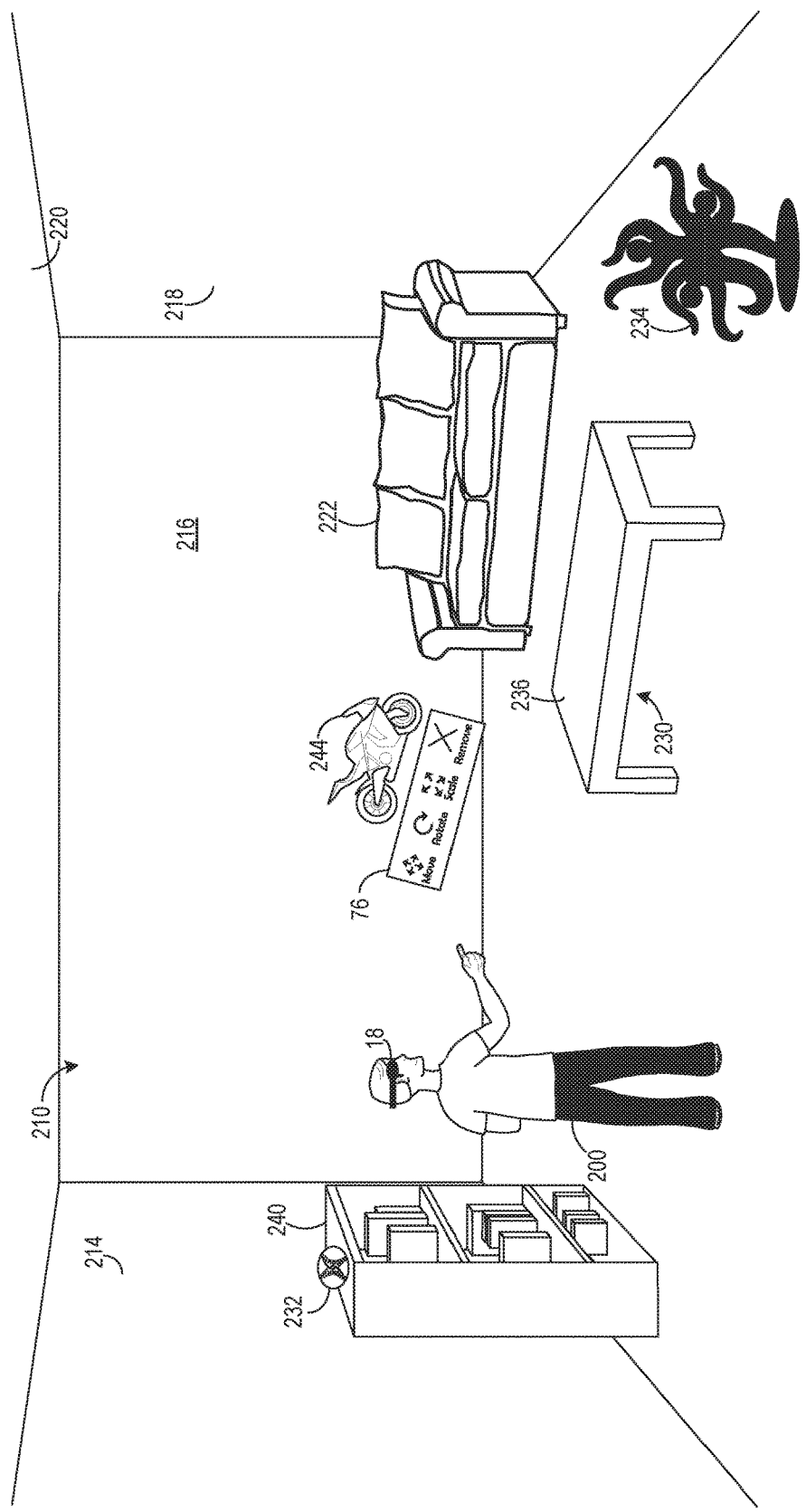
FIG. 2 shows a user wearing the head-mounted display device of FIG. 1 and viewing virtual content and user interface elements in a real world physical environment according to an example of the present disclosure.

With reference now to FIGS. 2-16, descriptions of example use cases of the present disclosure will now be provided. FIG. 2 is a schematic illustration of a user 200 wearing HMD device 18 and standing in the real world physical environment of a room 210. The room 210 includes a number of physical objects and surfaces, such as walls 214, 216 and 218, ceiling 220, couch 222, table 230, softball 232, art piece 234, and bookcase 240. Each of the physical objects may comprise one or more physical features, such as linear edges, curved edges, planar surfaces, curved surfaces, corners, angles, etc. For example, table 230 has a planar table top 236. In some examples physical features may represent useful semantic information, such as floors, doors, walls, ceilings, etc.

Figure 3:
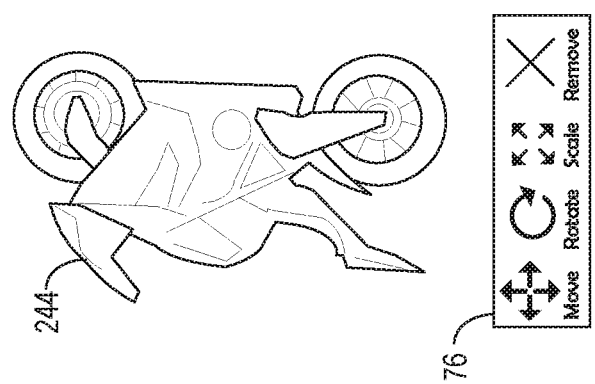
FIG. 3 shows the virtual content and user interface elements of FIG. 2 as viewed by the user in another orientation according to an example of the present disclosure.

As noted above, in some examples the HMD device 18 may display virtual content along with one or more user interface elements 76 that a user may select or otherwise utilize to interact with the virtual content. In the example of FIGS. 2 and 3, HMD device 18 displays virtual content in the form of a holographic motorcycle 244 and 4 virtual user interface elements 76. In this example, the user interface elements 76 take the form of a move control, rotate control, scale control and remove control. In other examples, fewer or more user interface elements may be displayed and/or other types of user interface elements may be displayed, such as push-buttons, slider controls, and controls providing other functionality for interacting with virtual content.

In some examples user interface element(s) may be displayed with a corresponding virtual object in an object-locked manner. In the example of FIG. 2, the UI elements 76 may be displayed in an object-locked manner with the holographic motorcycle 244. Accordingly, as the user 200 moves the motorcycle 244 within room 210, the UI elements 76 may follow the motorcycle as if attached to the motorcycle.

In some examples and to provide easy viewing and interaction, the UI elements 76 may be displayed as facing the HMD device 18 and user 200, regardless of their location in room 210 or the user's manipulation of corresponding virtual object. In the examples of FIGS. 2 and 3, as the user 200 manipulates the holographic motorcycle 244 (e.g., moves, rotates, scales or otherwise changes the display of the motorcycle), the UI elements 76 may be adjusted as needed to continue to face the HMD device 18 and user 200. In this manner, the UI elements 76 may be maintained in locations that are easily viewed by the user 200.

Upon selecting a UI element 76, the user 200 may provide user manipulation input via the HMD device 18 that manipulates the holographic motorcycle 244. For example, the user may gaze at a UI element to select it, and then use finger gestures to manipulate the displayed object according to the interface element. In some examples, the user may position, orient and scale the motorcycle 244 via the user's head gaze direction and/or other forms of user manipulation input. In one example, by altering his head gaze direction the user 200 may move the motorcycle 244 around the room 210. A distance between the motorcycle 244 and the HMD device 18 may be controlled by user voice commands, such as "Back" and "Forward." In another example of scaling the motorcycle 244, the user 200 may select the scale UI element 76, and then use a reverse-pinch finger gesture to uniformly increase the size of the motorcycle.

Figure 4:
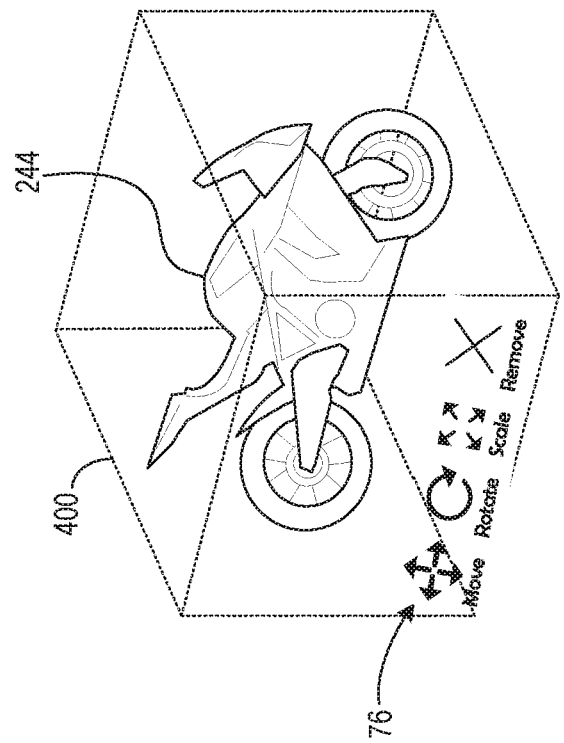
FIG. 4 shows the virtual content displayed in a virtual bounding box according to an example of the present disclosure.

With reference to FIG. 4, in some examples a virtual object may be displayed within a virtual bounding box or other virtual container. In the example of FIG. 4, the holographic motorcycle 244 is displayed within virtual bounding box 400. In this example, a user may manipulate the holographic motorcycle 244 by interacting with the virtual bounding box 400. Also in this example, the 4 virtual UI elements 76 are displayed on one face of the bounding box 400, such as the face that is oriented toward the HMD device 18.

As noted above, user 200 may interact with the UI elements 76 using one or more of a variety of interaction modalities. In some examples, when the UI elements 76 are displayed floating in the air, a layout of the elements may be optimized for gaze and/or gesture input from the user 200. For example, the UI elements 76 may be displayed as hovering in front of the corresponding virtual object and facing the HMD device 18 to enable easy selection by the user via gaze and/or gesture recognition. Additionally and as noted above, the layout of the UI elements 76 may be periodically adjusted such that the elements are facing the HMD device 18 and user 200.

In some examples, the user 200 may gaze at a UI element to select it, and then use finger gestures to manipulate the displayed object according to the interface element. In other examples, such selections may be effected by detecting a ray that is cast from the HMD device 18 and intersects with a UI element, by receiving a user voice command that selects a UI element, gesture detection, head position/orientation detection, hand-held remote control input, or any other suitable user interaction technique.

Figure 5:
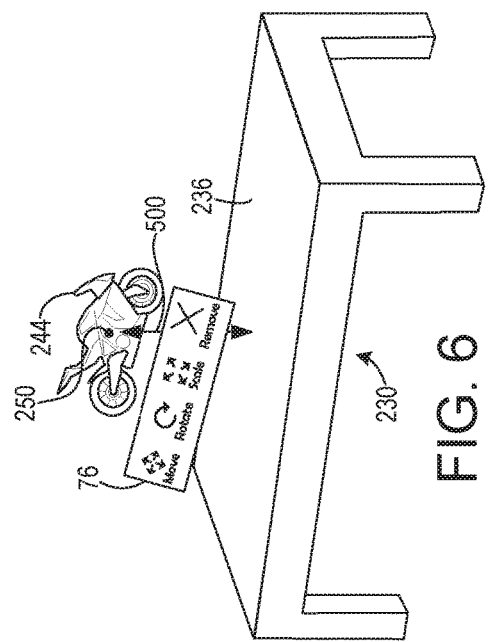
FIGS. 5-8 show the user interface elements transitioning to be displayed on the table top according to examples of the present disclosure.
Figure 6:
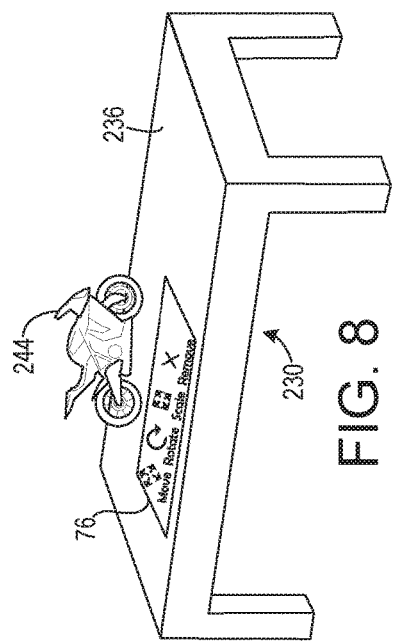
Figure 7:
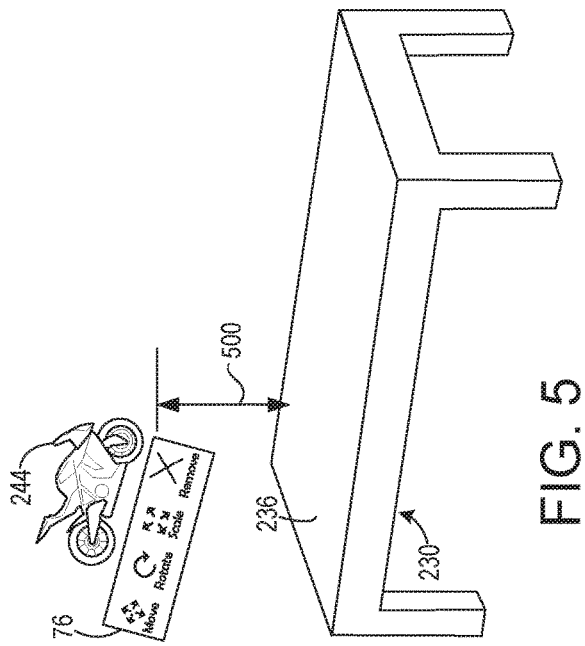

With reference now to FIGS. 5-7, in some examples and based on one or more determinations, the UI element layout program 12 may cause the UI elements 76 to be transitioned from a floating, in-air location to displayed on a physical surface. In this manner and as noted above, a user may experience haptic feedback when a UI element 76 is touched. With reference to FIG. 5, in some examples the UI element layout program 12 may use proximity to a physical surface to determine whether to display the UI elements 76 on the surface. More particularly, the user interface element layout program 12 may determine whether one or more of a virtual object and one or more UI elements are within a predetermined distance of a physical surface.

In the example of FIG. 5, the user interface element layout program 12 may determine whether the holographic motorcycle 244 and/or the UI elements 76 are within a predetermined distance 500 of the table top 236. In one example and with reference to FIG. 6, as the user 200 moves the motorcycle 244 and UI elements 76 toward the table top 236, user interface element layout program 12 may determine whether a center 250 of the motorcycle 244 is within the predetermined distance 500. In other examples, other locations associated with a virtual object may be designated by a developer or otherwise utilized to determine whether the object is within the predetermined distance of a physical surface.

In various examples, the predetermined distance may be 10 cm., 20 cm., 30 cm., 1 m., or any other suitable distance. In some examples, the predetermined distance 500 may be configurable by a user, a developer and/or other third party according to one or more factors. Examples of such factors may include an application with which the UI elements 76 are used, a size, shape or other visual characteristic of the corresponding virtual content, and user preferences.

With reference now to FIG. 7, when the user interface element layout program 12 determines that the center 250 of the motorcycle 244 is within the predetermined distance 500 of table top 236, the UI elements 76 are transitioned to display on the table top. Accordingly, and in one potential advantage of the present disclosure, a user may now select a UI element 76 by touching a location on the table top 236 where the element is displayed, and thereby experience the familiarity, intuitiveness and other advantages of haptic feedback.

A determination that the user is touching (selecting) a particular UI element 76 may be made using any suitable technique. For example, depth image data may be used to determine when the user's fingertip position intersects with the location of a UI element 76, such as via a collision detection engine. In some examples, other types of image data, such as RGB, black and white, IR, etc., may be used to determine when the user's fingertip position intersects with the location of a UI element 76. For example, one or more RGB cameras may capture image data and accumulate scene information as the user moves around a scene. A SLAM method, such as Parallel Tracking and Mapping, may be used with surface reconstruction techniques to determine when the user's fingertip position contacts the location of a UI element 76.

In other examples, a user may touch the UI element 76 using a stylus, pen or other hand-held instrument that includes one or more sensors that provide touch-detecting output. For example, a pen may include an accelerometer and/or tip switch that detects when the pen touches a surface. Such touch-detecting output may be provided to the HMD device 18 to indicate that the pen contacted the surface.

In other examples, other locations associated with a virtual object may be used to determine whether the object is within the predetermined distance of a physical surface. For example, another predetermined location on the holographic motorcycle 244 may be used to determine if the motorcycle is within the predetermined distance of the table top 236. With reference again to FIG. 4, where a bounding box 400 is displayed with the motorcycle 244, a distance from one or more sides of the bounding box to the surface may be determined. In one example, a distance from the center of each side of the bounding box 400 to the surface may be determined. The minimum of these 6 distances may be compared to the predetermined distance 500 to determine if the motorcycle 244 is within the predetermined distance.

In other examples and as noted above, the user interface element layout program 12 may determine whether to display the UI elements 76 on table top 236 by determining if the UI elements are within a predetermined distance 500 of the table top. As with the motorcycle 244, different locations associated with one or more of the UI elements 76 may be used to determine proximity to the surface. In other examples, the user interface element layout program 12 may be triggered to display the UI elements 76 on table top 236 based on determining that both the motorcycle 244 and the UI elements 76 are within a predetermined distance 500 of the table top.

With reference again to FIG. 7, in this example when the user interface element layout program 12 determines that the motorcycle 244 is within the predetermined distance 500 of table top 236, the UI elements 76 are transitioned to display on the table top, while the location of the motorcycle is maintained. In this manner, a desired location of the displayed motorcycle may be maintained while the UI elements 76 are conveniently transitioned to the table top 236 for touch-based interaction.

Figure 8:
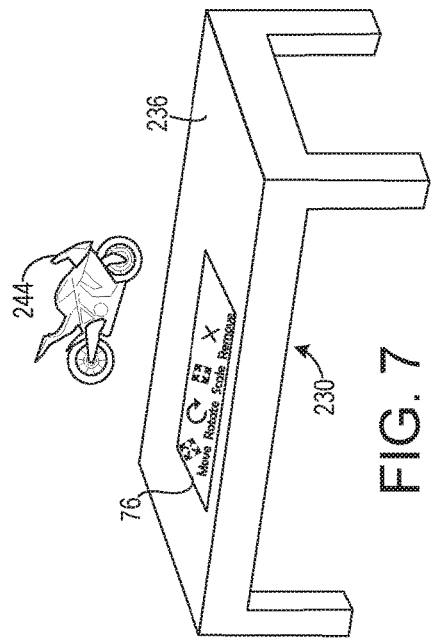

With reference to FIG. 8, in other examples when the user interface element layout program 12 determines that the motorcycle 244 and/or UI elements 76 are within the predetermined distance 500 of table top 236, both the UI elements 76 and the motorcycle 244 are transitioned to display on the table top. As shown in FIG. 8, in this example the motorcycle 244 is transitioned to be displayed as sitting on the table top 236 with the UI elements 76 displayed conveniently in front of the motorcycle on the table top.

In some examples, when the user interface element layout program 12 determines that one or more of a virtual object and user interface element(s) are is within a predetermined distance of a surface, the layout program may programmatically transition the display of the one or more user interface elements to the surface without user interaction. In other examples, when the program determines that one or more of a virtual object and user interface element(s) are within the predetermined distance, the program may display the one or more user interface elements on the surface when the user provides a release input, such as a predetermined gesture, a voice command, or other user input.

In some examples, the user interface element layout program 12 may receive user input to switch the display mode of one or more UI elements 76 from floating at an in-air location to being displayed on a physical surface. For example, where one or more UI elements 76 are not within the predetermined distance of the surface, the user may provide user input (such as a voice command) to adjust the UI elements to being displayed on the surface. In a similar manner, the user interface element layout program 12 may receive user input to switch the display mode of one or more UI elements 76 from being displayed on the physical surface to floating at an in-air location.

In some examples, displaying one or more UI elements on the physical surface also may be based on determining that the physical surface has a surface area greater than a predetermined minimum surface area. In some examples and with reference again to FIG. 2, the HMD device 18 may determine whether the surface area of one or more surfaces, such as the table top 236, walls 214, 216 and 218, ceiling 220, and the top surface 242 of bookcase 240, is greater than a predetermined minimum surface area.

In some examples, the predetermined minimum surface area may be approximately 225 $mm^2$, such as a 15 mm×15 mm square, to enable the HMD device 18 to accurately determine that a user touches this area with a finger. In other examples, a smaller predetermined minimum surface area may be used, such as where a user may use a stylus, pen or other more precise touching instrument. In other examples, larger predetermined minimum surface areas may be used to accommodate the display of larger UI element(s) 76, to provide for more robust touch-detection by the HMD device 18, and/or based on other considerations.

In some examples, displaying one or more user interface elements on the physical surface also may be based on determining that the physical surface comprises a planar surface. For example, one or more planar surfaces, such as table top 236 or wall 216, may be identified from image data 26 received by the HMD device 18. Any suitable scene analysis method or other technique for identifying planar surfaces may be utilized. In some examples, for a given surface the HMD device 18 may determine a depth error/distance between each depth pixel of the surface and a plane projected onto the surface. If the cumulative depth errors for the depth pixels of the surface are below a predetermined threshold, then the surface may be determined to be a planar surface.

In some examples, a RANSAC method may be applied to depth image data to locate planar surfaces. In some examples, surface reconstruction techniques, such as techniques using contour completion models, may be utilized. In some examples, depth image normals may be utilized to develop a plane equation parameterized by its azimuth, elevation, and distance from an origin. A Hough transform on 3D depth points may be used to detect major plane equations in the scene. In some examples a greedy heuristic may be used to associate scene points with those planes. Unassigned 3D points may be associated with a candidate plane if they lie in the vicinity of the candidate plane, such as within 10 cm., and have compatible normal directions, such as within 10° of the candidate plane normal. As noted above, other scene analysis methods and techniques for identifying planar surfaces may be utilized.

In some examples, displaying one or more UI elements on the physical surface also may be based on determining whether the physical surface comprises one or more surface characteristics. For example, a physical surface identified as having one or more negative optical properties may not be selected, or may be classified as a less-preferred surface, for displaying UI elements 76. A negative optical property may be a property or characteristic that impairs the ability of the HMD device 18 to accurately determine the location of the surface, and thereby impairs touch-detection. For example, where IR depth image data is used, a negative optical property of a surface may be its tendency to absorb IR light. Other examples of negative optical properties may include the amount of texture embodied in a surface and degrees of glare produced by a surface.

Figure 9:
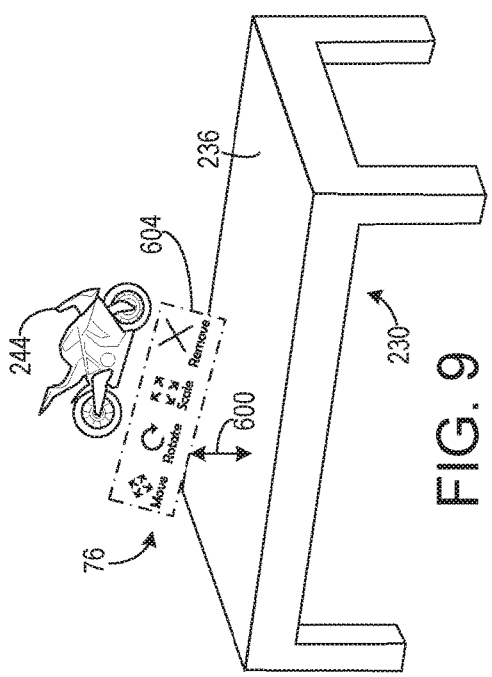
FIGS. 9-10 show examples of providing a visual indication according to examples of the present disclosure.
Figure 10:
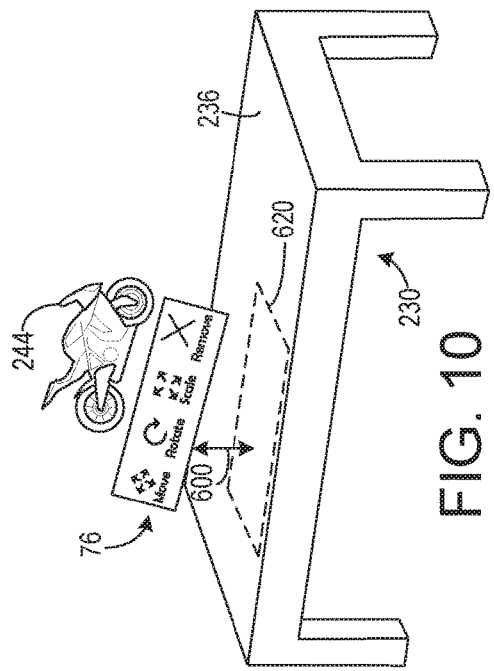

With reference now to FIGS. 9 and 10, in some examples when the user interface element layout program 12 determines that one or more of the virtual object and the one or more UI elements are within the predetermined distance of a physical surface, the program may display one or more of (1) a visual indication with the one or more user interface elements and (2) a visual indication on the physical surface. In the example of FIG. 9, the user interface element layout program 12 may determine that the UI elements 76 are within a predetermined distance 600 of table top 236.

On making this determination, the user interface element layout program 12 may display a visual indication with the user interface elements 76, such as a highlighted border 604 around the elements. In other examples, any other visual indication may be provided, such as adding color to or changing a color of the UI elements 76. In this manner, visual feedback is provided to the user to alert the user that the UI elements 76 may be transitioned to the table top 236. As noted above, in some examples the UI elements 76 may be programmatically transitioned to the table top 236, such as following a short pause after the highlighted border 604 is displayed. In other examples and following the display of the highlighted border 604, the user may provide user input that causes the UI elements 76 to display on the table top 236.

In the example of FIG. 10, when the user interface element layout program 12 determines that the UI elements 76 are within the predetermined distance 600 of table top 236, a visual indication may be displayed on the table top. In this example, the visual indication takes the form of an outlined area 620 that represents the location on the table top 236 where the UI elements 76 will be displayed. In other examples, any other visual indication may be provided, such as displaying an icon or other character on the table top 236. In this manner, visual feedback is provided to the user to alert the user that the UI elements 76 may be transitioned to the table top 236. In other examples, the user interface element layout program 12 may display both a visual indication with the UI elements 76 and a visual indication on the table top 236.

Figure 11:
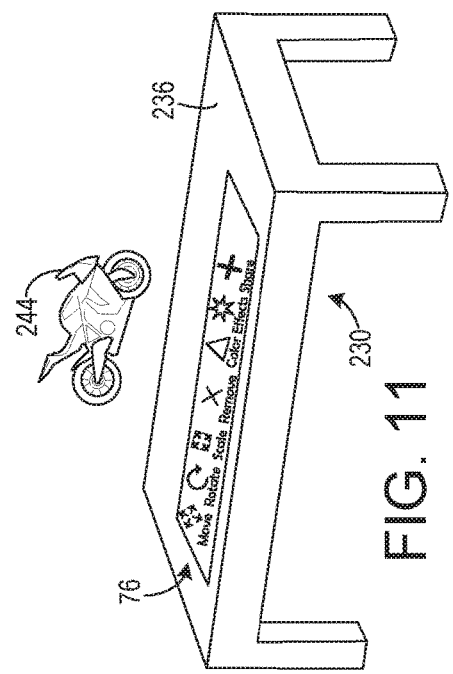
FIG. 11 shows displaying additional user interface elements on the physical surface according to an example of the present disclosure.

With reference now to FIGS. 6 and 11, in some examples when the user interface element layout program 12 determines that one or more of the virtual object and the one or more user interface elements are within the predetermined distance of a physical surface, the program may display one or more additional UI elements 76 on the surface. For example, the interface element layout program 12 may determine that the surface area of the physical surface can accommodate more UI elements 76 than those currently displayed as floating in-air.

In the example of FIG. 6, the user interface element layout program 12 displays 4 UI elements 76 hovering in front of motorcycle 244. When the display of the UI elements 76 is transitioned to the table top 236, and with reference now to FIG. 11, the user interface element layout program 12 may display 3 additional UI elements 76 in the form of a color control, effects control and sharing control. Accordingly, in this example the user may be afforded additional touchable interaction options on the table top 236. In other examples, any number and type of additional UI elements 76 may be displayed.

Figure 12:
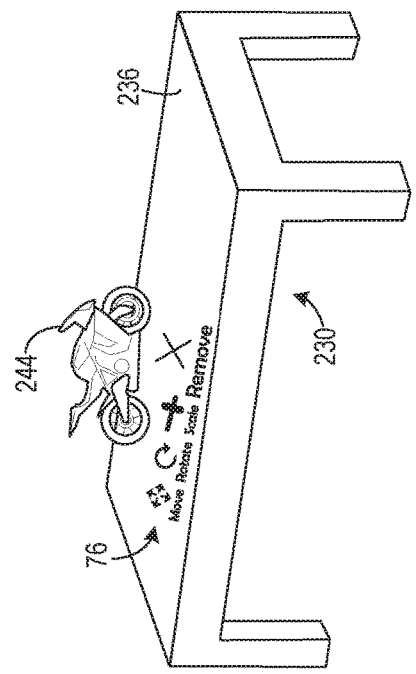
FIG. 12 shows modifying the display of at least one user interface element for touch input according to examples of the present disclosure.
Figure 14:
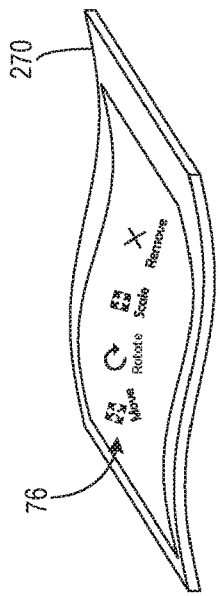
FIG. 14 shows displaying the user interface elements with curved portions that match curved portions of a physical surface according to an example of the present disclosure.
Figure 15:
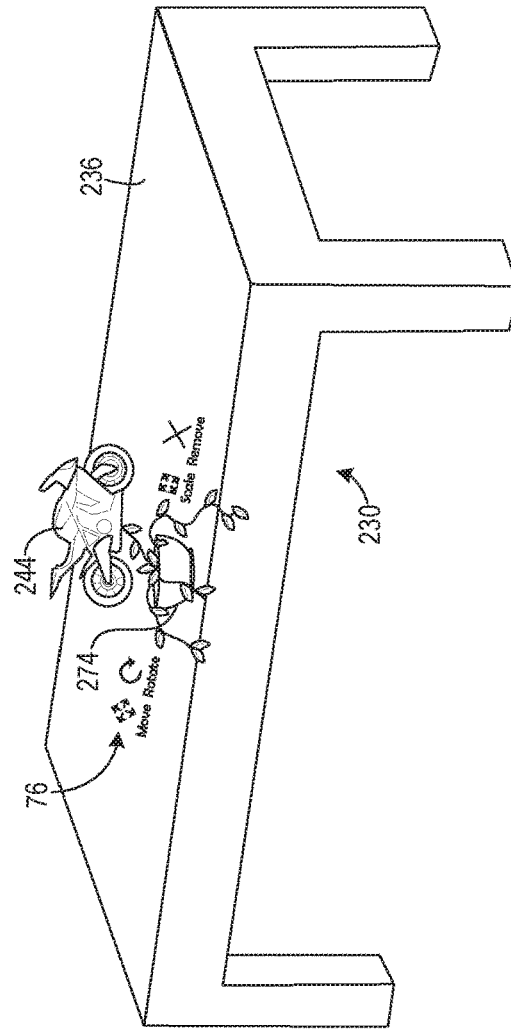
FIG. 15 shows displaying user interface elements on the physical surface at locations that avoid an obstruction according to an example of the present disclosure.

In some examples, upon displaying the one or more user interface elements on the physical surface, the user interface element layout program 12 may modify the display of at least one of the one or more user interface elements for touch input. With reference to FIG. 12, in one example when the user interface elements 76 are displayed on table top 236, the remove UI element 76 is enlarged for easier touch access by a user. In another example shown in FIG. 12, when the user interface elements 76 are displayed on table top 236, the scale UI element 76 is modified from the four-arrow configuration shown in FIG. 10 to a slider configuration that a user may directly manipulate with touch input. In other examples, other changes to the display of one or more of the user interface elements 76 that enable or enhance touch input may be provided.

In some examples, the user interface element layout program 12 may determine a location for displaying the one or more user interface elements on the physical surface based at least on one or more user characteristics. Such user characteristics may include, for example, the handedness of a user (i.e., whether a user is right-handed or left-handed) and an arm-length or reach of a user.

Figure 13:
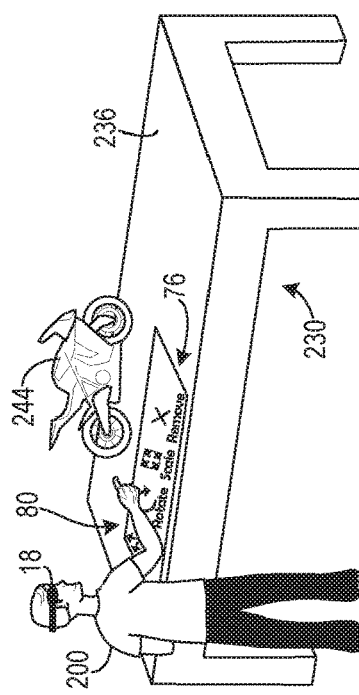
FIG. 13 shows displaying the user interface elements on the physical surface based on one or more user characteristics according to an example of the present disclosure.
Figure 16:
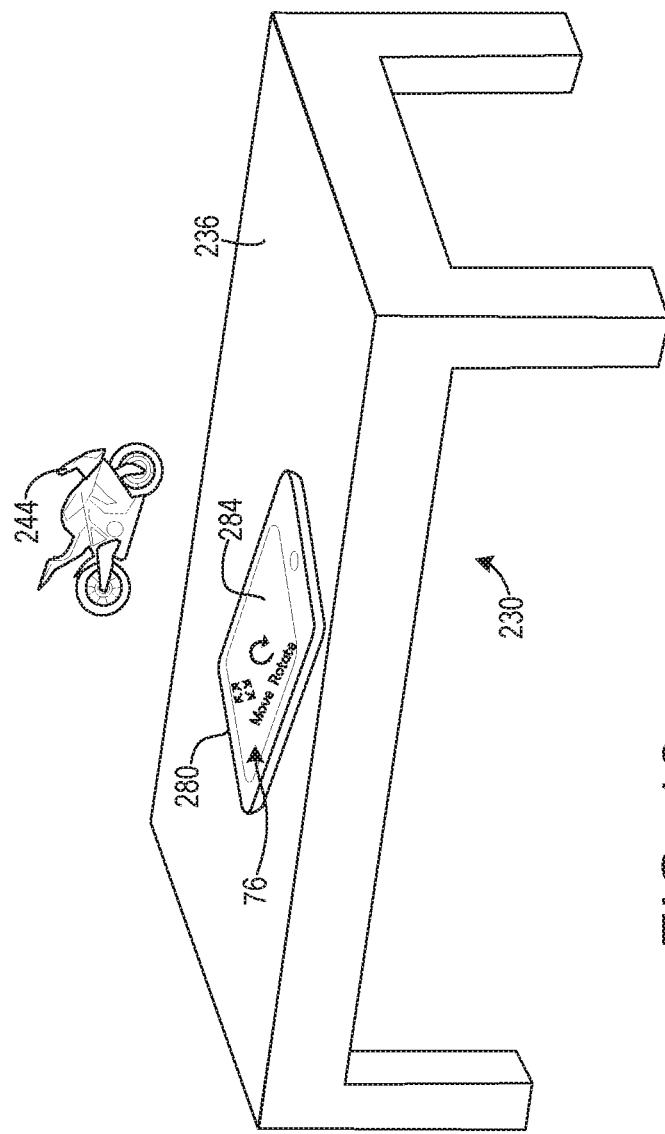
FIG. 16 shows displaying the user interface elements on a touch-detecting surface of a physical surface according to an example of the present disclosure.

With reference to FIG. 13 and in one example, upon transitioning the display of the user interface elements 76 to the physical surface, the user interface element layout program 12 may access an arm length for user 200 that is stored in, for example, user profile data for the user. Based on the user's arm length, the HMD device 18 may display the UI elements 76 on table top 236 at location 98 that is within a comfortable reach of user 200.

In other examples, the user interface element layout program 12 may determine a location for displaying the user interface elements 76 on the table top 236 based at least on a location of the user 200 relative to the table top. For example, in FIG. 13 and based on the user 200 standing on the left side of the table, the UI elements 76 may be displayed at location 98 that is on the left side of the table top 236 and in front of the user.

In some examples, the physical surface may comprise at least one non-planar portion, and displaying the one or more UI elements on the physical surface may comprise displaying the one or more UI elements with a non-planar portion that matches the at least one non-planar portion of the surface. For example and with reference to FIG. 14, in one example the user interface element layout program 12 may determine that the UI elements 76 are within a predetermined distance of a curved portion of material 270. In this example, the user interface element layout program 12 may display the UI elements 76 with curving potions that match the contour of the curved portions of the material 270. In this manner, the UI elements are displayed to appear co-extensive with the curving surface of the material 270.

In some examples, the user interface element layout program 12 may determine a location for displaying the one or more UI elements on a physical surface that avoids at least one obstruction on the physical surface. For example and with reference to FIG. 15, in this example a plant 274 may be sitting on table top 236 in a location where the UI elements 76 are to be displayed upon transitioning from a floating, in-air location. To avoid displaying the UI elements 76 on the plant while still displaying the elements near a desired location, the user interface element layout program 12 may modify the layout of the UI elements to a modified layout in which the move and rotate controls are displayed to the left of the plant 274 on the table top 236, and the scale and remove controls are displayed to the right of the plant.

In some examples, the user interface element layout program 12 may determine that a physical surface comprises a touch-detecting surface. Based on this determination, one or more UI elements 76 may be displayed on the touch-detecting surface. For example and with reference to FIG. 16, the user interface element layout program 12 may determine that a touchscreen tablet 280 is resting on the table top 236. The user interface element layout program 12 may identify this device using any suitable method. For example, the device may be identified via matching image data of the device with stored images of the touchscreen tablet 280, or via data received from the tablet at the HMD device 18. By identifying the touchscreen tablet 280, the user interface element layout program 12 may determine that the tablet includes touch-detecting surface 284.

Based at least on determining that touchscreen tablet 280 comprises touch-detecting surface 284, the user interface element layout program 12 may display move and rotate UI elements 76 on the touch-detecting surface. In this manner, the tablet 280 may detect user touches of the UI elements 76 on the touch-detecting surface 284. Where the touchscreen tablet 280 is communicatively coupled with the HMD device 18, the tablet may provide such touch data to the HMD device 18. The HMD device 18 may use this touch data to determine when a user touches one of the UI elements 76.

With reference again to FIG. 2, in some examples the user interface element layout program 12 may select a physical surface from two or more physical surfaces that are detected by the HMD device 18. For example, techniques for training a probabilistic model over time to select from among multiple surfaces may be utilized, such as training a neural network. The output of such model may correspond to a likelihood that a given surface is a good target for displaying the UI element(s).

In some examples, each of multiple surfaces may be associated with a weighted value, and the user interface element layout program 12 may select a surface based on the weighted values. For example, the physical surface having the lowest weighted value among the plurality of weighted values may be selected. The weighted values may correspond to one or more characteristics or attributes of the surface.

For example, a weighted value may correspond to a type of the surface. In some examples, a floor may be a less desirable surface for displaying UI elements than a wall. Accordingly, a surface identified as a floor may have a higher weighted value (i.e., a higher negative weight) than a surface identified as a wall. A surface adjacent to a corner may be less desirable, and may have a higher weighted value, than a surface further away from the corner. In some examples, for each of a plurality of candidate surfaces, the user interface element layout program 12 may use a heuristic to select the surface having the lowest weighted value. The one or more UI elements 76 then may be displayed on the selected surface.

In some examples, an identified physical surface may have one or more blacklisted properties that make it unsuitable or undesirable for displaying UI elements. In some examples, semantic properties of a surface may be identified to determine whether the surface comprises a blacklisted property. For example, it may be undesirable to display UI elements on a floor, as a user touching the floor may be deemed inappropriate. Similarly, surfaces having a location outdoors may be deemed undesirable for the display of UI elements. Surfaces having certain compositions, such as mud or concrete, may be deemed inappropriate for the display of UI elements. Other surface qualities deemed inappropriate for touching, such as hot surfaces or potentially sharp surfaces, also may be included as blacklisted properties.

Using image data and/or other data, the HMD device 18 may determine whether a particular physical surface comprises one or more blacklisted properties. Where the surface is determined not to comprise a blacklisted property, one or more UI elements may be displayed on the surface as described above.

Figure 17A:
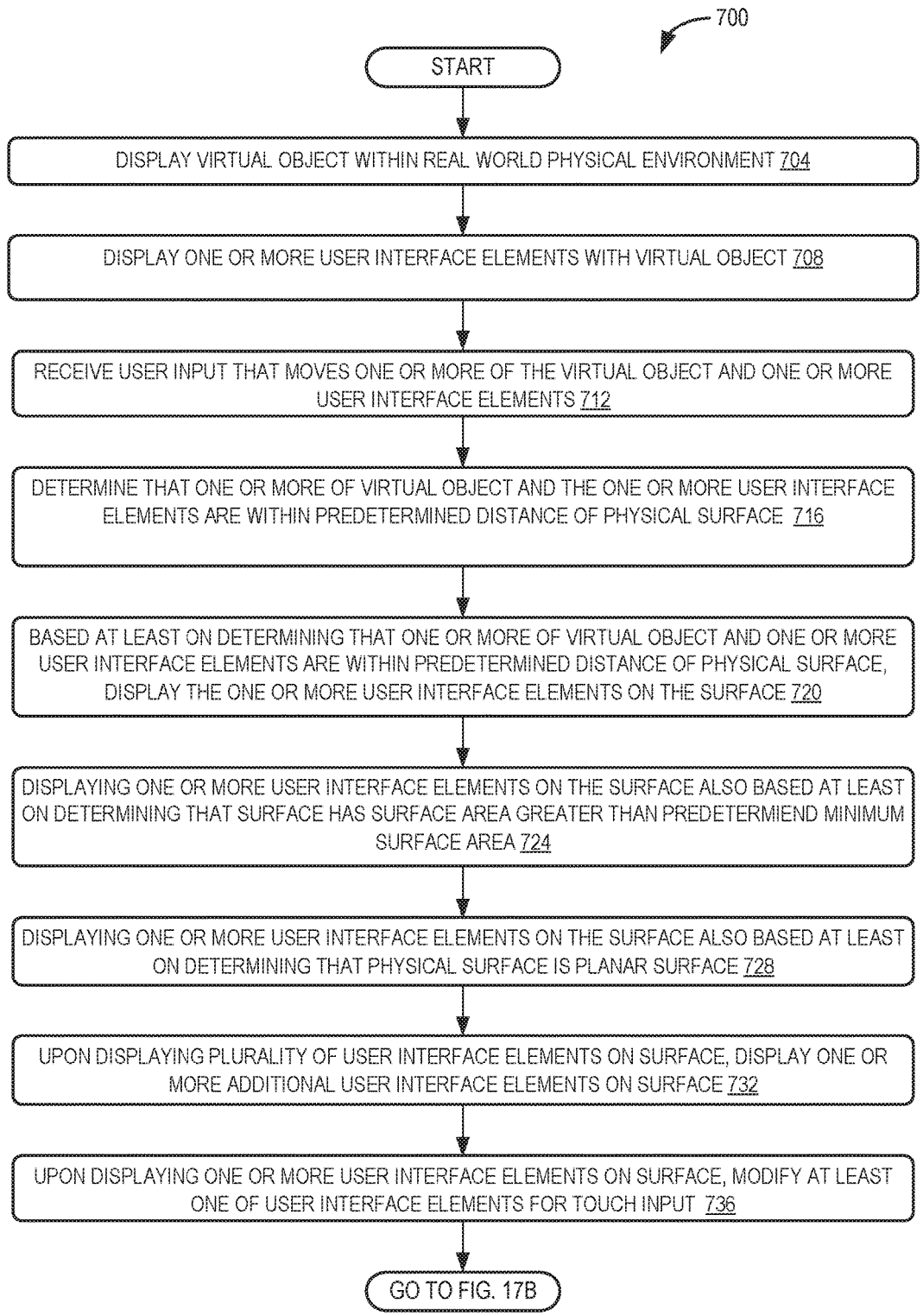
FIGS. 17A and 17B are a flow chart of a method for displaying one or more user interface elements on a physical surface according to examples of the present disclosure.
Figure 17B:
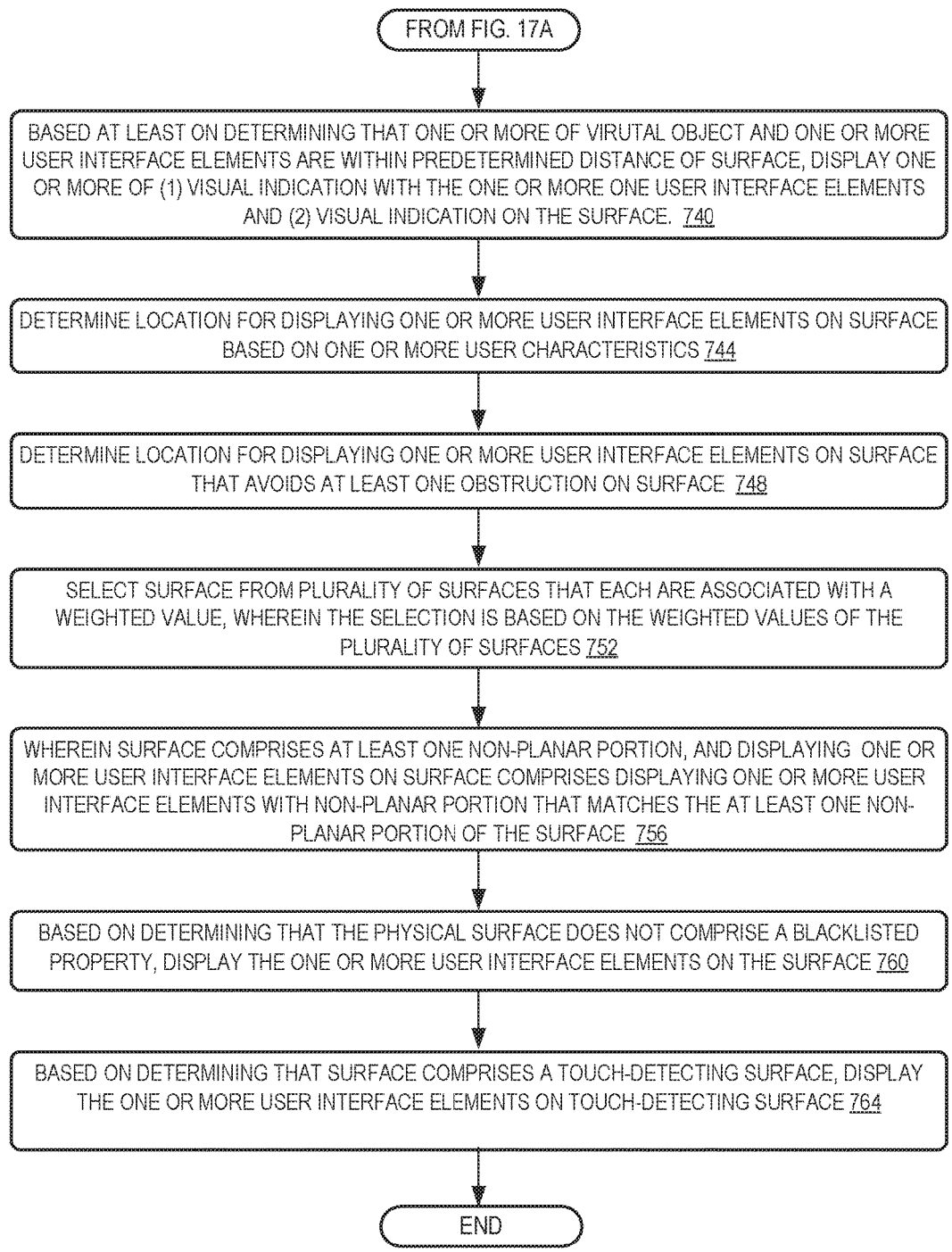

FIGS. 17A and 17B illustrate a flow chart of a method 700 for displaying one or more user interface elements on a physical surface according to examples of the present disclosure. The following description of method 700 is provided with reference to the software and hardware components described above and shown in FIGS. 1-16. It will be appreciated that method 700 also may be performed in other contexts using other suitable hardware and software components.

With reference to FIG. 17A, at 704 the method 700 may include displaying a virtual object within a real world physical environment. At 708 the method 700 may include displaying one or more user interface elements with the virtual object. At 712 the method 700 may include receiving user input that moves one or more of the virtual object and the one or more user interface elements. At 716 the method 700 may include determining that one or more of the virtual object and the one or more user interface elements are within a predetermined distance of a physical surface.

At 720 the method 700 may include, based at least on determining that one or more of the virtual object and the one or more user interface elements are within the predetermined distance of the physical surface, displaying the one or more user interface elements on the physical surface. At 724 the method 700 may include, wherein displaying the one or more user interface elements on the surface is also based at least on determining that the physical surface has a surface area greater than a predetermined minimum surface area. At 728 the method 700 may include, wherein displaying the one or more user interface elements on the physical surface is also based at least on determining that the physical surface comprises a planar surface.

At 732 the method 700 may include, upon displaying the one or more user interface elements on the physical surface, displaying one or more additional user interface elements on the physical surface. At 736 the method 700 may include, upon displaying the one or more user interface elements on the physical surface, modifying the display of at least one of the one or more user interface elements for touch input. With reference now to FIG. 17B, at 740 the method 700 may include, based at least on determining that one or more of the virtual object and the one or more user interface elements are within the predetermined distance of the physical surface, displaying one or more of (1) a visual indication with the one or more user interface elements and (2) a visual indication on the physical surface.

At 744 the method 700 may include determining a location for displaying the one or more user interface elements on the physical surface based at least on one or more user characteristics. At 748 the method 700 may include determining a location for displaying the one or more user interface elements on the physical surface that avoids at least one obstruction on the physical surface. At 752 the method 700 may include selecting the physical surface from a plurality of physical surfaces that each are associated with a weighted value, wherein the selection of the physical surface is based on the weighted values of the plurality of physical surfaces.

At 756 the method 700 may include, wherein the physical surface comprises at least one non-planar portion, and displaying the one or more user interface elements on the physical surface comprises displaying the one or more user interface elements with a non-planar portion that matches the at least one non-planar portion of the surface. At 760 the method 700 may include, based at least on determining that the physical surface does not comprise a blacklisted property, displaying the one or more user interface elements on the surface. At 764 the method 700 may include, based at least on determining that the physical surface comprises a touch-detecting surface, displaying the one or more user interface elements on the touch-detecting surface.

It will be appreciated that method 700 is provided by way of example and is not meant to be limiting. Therefore, it is to be understood that method 700 may include additional and/or alternative steps relative to those illustrated in FIGS. 17A and 17B. Further, it is to be understood that method 700 may be performed in any suitable order. Further still, it is to be understood that one or more steps may be omitted from method 700 without departing from the scope of this disclosure.

In some embodiments, the methods and processes described herein may be tied to a computing system of one or more computing devices. In particular, such methods and processes may be implemented as a computer-application program or service, an application-programming interface (API), a library, and/or other computer-program product.

Figure 18:
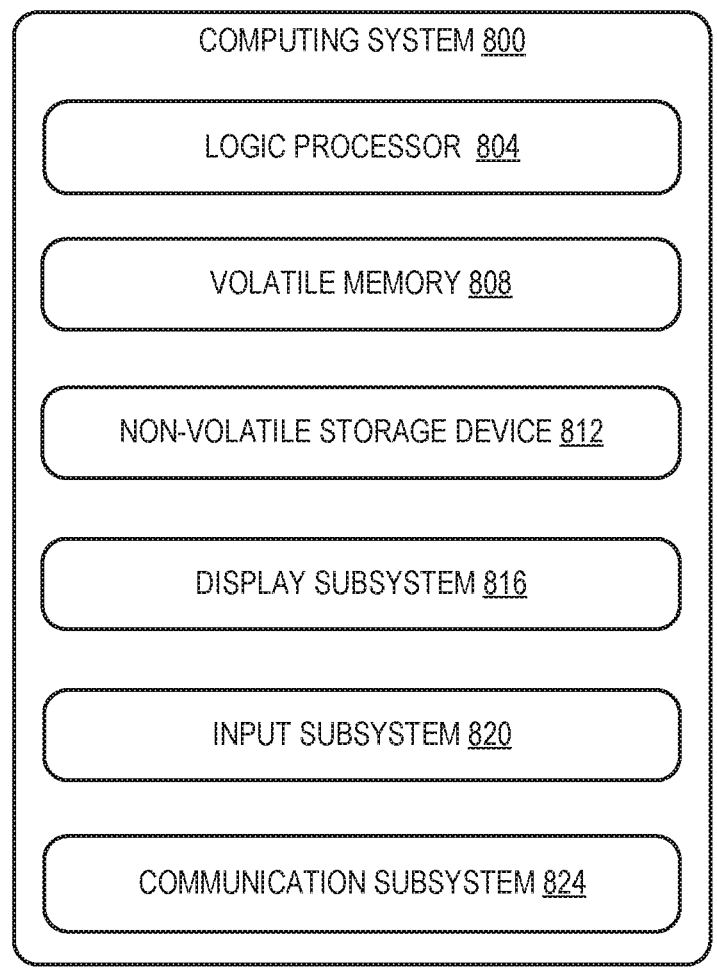
FIG. 18 shows a computing system according to an example of the present disclosure.

FIG. 18 schematically shows a non-limiting embodiment of a computing system 800 that can enact one or more of the methods and processes described above. Computing device 10 and computing device 80 shown in FIG. 1 may take the form of or include one or more aspects of computing system 800. Computing system 800 is shown in simplified form. It is to be understood that virtually any computer architecture may be used without departing from the scope of this disclosure. In different examples, computing system 800 may take the form of or be communicatively coupled with a head-mounted display device, tablet computer, home entertainment computer, desktop computer, network computing device, tablet, notebook, smartphone, gaming device, other mobile computing device, etc.

Computing system 800 includes a logic processor 804, volatile memory 808, and a non-volatile storage device 812. Computing system 800 may optionally include a display subsystem 816, input subsystem 820, communication subsystem 824, and/or other components not shown in FIG. 18.

Logic processor 804 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 804 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects may be run on different physical logic processors of various different machines.

Volatile memory 808 may include physical devices that include random access memory. Volatile memory 808 is typically utilized by logic processor 804 to temporarily store information during processing of software instructions. It will be appreciated that volatile memory 808 typically does not continue to store instructions when power is cut to the volatile memory 808.

Non-volatile storage device 812 includes one or more physical devices configured to hold instructions executable by the logic processors to implement the methods and processes described herein. When such methods and processes are implemented, the state of non-volatile storage device 812 may be transformed—e.g., to hold different data.

Non-volatile storage device 812 may include physical devices that are removable and/or built-in. Non-volatile storage device 812 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 812 may include nonvolatile, dynamic, static, read/write, read-only, sequential-access, location-addressable, file-addressable, and/or content-addressable devices. It will be appreciated that non-volatile storage device 812 is configured to hold instructions even when power is cut to the non-volatile storage device 812.

Aspects of logic processor 804, volatile memory 808, and non-volatile storage device 812 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The term "program" may be used to describe an aspect of computing system 800 implemented to perform a particular function. In some cases, a program may be instantiated via logic processor 804 executing instructions held by non-volatile storage device 812, using portions of volatile memory 808. It will be understood that different programs may be instantiated from the same application, service, code block, object, library, routine, API, function, etc. Likewise, the same program may be instantiated by different applications, services, code blocks, objects, routines, APIs, functions, etc. The term "program" encompasses individual or groups of executable files, data files, libraries, drivers, scripts, database records, etc.

When included, display subsystem 816 may be used to present a visual representation of data held by non-volatile storage device 812. As the herein described methods and processes change the data held by the non-volatile storage device, and thus transform the state of the non-volatile storage device, the state of display subsystem 816 may likewise be transformed to visually represent changes in the underlying data. Display subsystem 816 may include one or more display devices utilizing virtually any type of technology. Such display devices may be combined with logic processor 804, volatile memory 808, and/or non-volatile storage device 812 in a shared enclosure, or such display devices may be peripheral display devices. With respect to the example HMD device 18 of FIG. 1, the see-through display 36 configured to visually augment an appearance of a real-world three dimensional physical environment by displaying virtual objects such as holograms is an example of a display subsystem 816.

When included, input subsystem 820 may comprise or interface with one or more user-input devices. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, inertial measurement unit, and/or gyroscope for motion detection, gaze detection, and/or intent recognition, electric-field sensing componentry for assessing brain activity, any of the sensors described above with respect to HMD device 18, and/or any other suitable sensor.

When included, communication subsystem 824 may be configured to communicatively couple computing system 800 with one or more other computing devices. Communication subsystem 824 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 800 to send and/or receive messages to and/or from other devices via a network such as the Internet.

The following paragraphs provide additional support for the claims of the subject application. One aspect provides a method at a computing device comprising a display, the method comprising: displaying a virtual object within a real world physical environment; displaying one or more user interface elements with the virtual object; receiving user input that moves one or more of the virtual object and the one or more user interface elements; determining that one or more of the virtual object and the one or more user interface elements are within a predetermined distance of a physical surface; and based at least on determining that one or more of the virtual object and the one or more user interface elements are within the predetermined distance of the physical surface, displaying the one or more user interface elements on the physical surface. The method may additionally or optionally include, wherein displaying the one or more user interface elements on the surface is also based at least on determining that the physical surface has a surface area greater than a predetermined minimum surface area. The method may additionally or optionally include, wherein displaying the one or more user interface elements on the physical surface is also based at least on determining that the physical surface comprises a planar surface. The method may additionally or optionally include, upon displaying the one or more user interface elements on the physical surface, displaying one or more additional user interface elements on the physical surface. The method may additionally or optionally include, upon displaying the one or more user interface elements on the physical surface, modifying the display of at least one of the one or more user interface elements for touch input. The method may additionally or optionally include, based at least on determining that one or more of the virtual object and the one or more user interface elements are within the predetermined distance of the physical surface, displaying one or more of (1) a visual indication with the one or more user interface elements and (2) a visual indication on the physical surface. The method may additionally or optionally include, determining a location for displaying the one or more user interface elements on the physical surface based at least on one or more user characteristics. The method may additionally or optionally include, determining a location for displaying the one or more user interface elements on the physical surface that avoids at least one obstruction on the physical surface. The method may additionally or optionally include, selecting the physical surface from a plurality of physical surfaces that each are associated with a weighted value, wherein the selection of the physical surface is based on the weighted values of the plurality of physical surfaces. The method may additionally or optionally include, wherein the physical surface comprises at least one non-planar portion, and displaying the one or more user interface elements on the physical surface comprises displaying the one or more user interface elements with a non-planar portion that matches the at least one non-planar portion of the surface. The method may additionally or optionally include, based at least on determining that the physical surface does not comprise a blacklisted property, displaying the one or more user interface elements on the surface. The method may additionally or optionally include, based at least on determining that the physical surface comprises a touch-detecting surface, displaying the one or more user interface elements on the touch-detecting surface.

Another aspect provides a computing device for displaying virtual content via a display device, the computing device comprising: a processor; and a memory holding instructions executable by the processor to: display a virtual object as floating within an environment; display one or more user interface elements as floating with the virtual object; receive user input that moves one or more of the virtual object and the one or more user interface elements; determine that one or more of the virtual object and the one or more user interface elements are within a predetermined distance of a physical surface; and based at least on determining that one or more of the virtual object and the one or more user interface elements are within the predetermined distance of the physical surface, display the one or more user interface elements on the surface. The computing device may additionally or alternatively include, wherein displaying the one or more user interface elements on the surface is also based at least on determining that the physical surface has a surface area greater than a predetermined minimum surface area. The computing device may additionally or alternatively include, wherein displaying the one or more user interface elements on the physical surface is also based at least on determining that the physical surface comprises a planar surface. The computing device may additionally or alternatively include, wherein the instructions are executable to, upon displaying the one or more user interface elements on the physical surface, display one or more additional user interface elements on the physical surface. The computing device may additionally or alternatively include, wherein the instructions executable to, upon displaying the one or more user interface elements on the physical surface, modify the display of at least one of the one or more user interface elements for touch input. The computing device may additionally or alternatively include, wherein the instructions executable to, based on receiving user input to switch a display mode, either switch the display of the one or more user interface elements from an in-air location to the physical surface, or switch the display of the one or more user interface elements from the physical surface to the in-air location. The computing device may additionally or alternatively include, wherein the instructions are executable by the processor to: determine that the physical surface comprises a touch-detecting surface; and based at least on determining that the physical surface comprises a touch-detecting surface, display the one or more user interface elements on the touch-detecting surface.

Another aspect provides a head-mounted display device, comprising: a see-through display; a processor; and a memory holding instructions executable by the processor to: receive image data of a real world physical environment; display a virtual object within a real world physical environment; display a plurality of user interface elements with the virtual object; receive user input that moves the virtual object and the plurality of user interface elements; determine that one or more of the virtual object and the plurality of user interface elements are within a predetermined distance of a physical surface; determine that the physical surface has a surface area greater than a predetermined minimum surface area; and based at least on determining that one or more of the virtual object and the plurality of user interface elements are within the predetermined distance of the physical surface, and determining that the physical surface has a surface area greater than the predetermined minimum surface area, display the plurality of user interface elements on the surface.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. At a computing device comprising a display, a method, comprising:
    displaying a virtual object within a real world physical environment;
    displaying one or more user interface elements with the virtual object;
    receiving user input that moves one or more of the virtual object and the one or more user interface elements;
    determining that one or more of the virtual object and the one or more user interface elements are within a predetermined distance of a physical surface;
    based at least on determining that one or more of the virtual object and the one or more user interface elements are within the predetermined distance of the physical surface, transitioning the one or more user interface elements independently from the virtual object for display on the physical surface; and
    displaying the one or more user interface elements on the physical surface.

2. The method of claim 1, wherein displaying the one or more user interface elements on the surface is also based at least on determining that the physical surface has a surface area greater than a predetermined minimum surface area.

3. The method of claim 1, wherein displaying the one or more user interface elements on the physical surface is also based at least on determining that the physical surface comprises a planar surface.

4. The method of claim 1, further comprising, upon displaying the one or more user interface elements on the physical surface, displaying one or more additional user interface elements on the physical surface.

5. The method of claim 1, further comprising, upon displaying the one or more user interface elements on the physical surface, modifying the display of at least one of the one or more user interface elements for touch input.

6. The method of claim 1, further comprising, based at least on determining that one or more of the virtual object and the one or more user interface elements are within the predetermined distance of the physical surface, displaying one or more of (1) a visual indication with the one or more user interface elements and (2) a visual indication on the physical surface.

7. The method of claim 1, further comprising determining a location for displaying the one or more user interface elements on the physical surface based at least on one or more user characteristics.

8. The method of claim 1, further comprising determining a location for displaying the one or more user interface elements on the physical surface that avoids at least one obstruction on the physical surface.

9. The method of claim 1, further comprising selecting the physical surface from a plurality of physical surfaces that each are associated with a weighted value, wherein the selection of the physical surface is based on the weighted values of the plurality of physical surfaces.

10. The method of claim 1, wherein the physical surface comprises at least one non-planar portion, and displaying the one or more user interface elements on the physical surface comprises displaying the one or more user interface elements with a non-planar portion that matches the at least one non-planar portion of the surface.

11. The method of claim 1, further comprising, based at least on determining that the physical surface does not comprise a blacklisted property, displaying the one or more user interface elements on the surface.

12. The method of claim 1, further comprising, based at least on determining that the physical surface comprises a touch-detecting surface, displaying the one or more user interface elements on the touch-detecting surface.

13. A computing device for displaying virtual content via a display device, the computing device comprising:
    a processor; and
    a memory holding instructions executable by the processor to:
        display a virtual object as floating within an environment;
        display one or more user interface elements as floating with the virtual object;
        receive user input that moves one or more of the virtual object and the one or more user interface elements;
        determine that one or more of the virtual object and the one or more user interface elements are within a predetermined distance of a physical surface;
        based at least on determining that one or more of the virtual object and the one or more user interface elements are within the predetermined distance of the physical surface, transition the one or more user interface elements independently from the virtual object for display on the physical surface; and
        display the one or more user interface elements on the surface.

14. The computing device of claim 13, wherein displaying the one or more user interface elements on the surface is also based at least on determining that the physical surface has a surface area greater than a predetermined minimum surface area.

15. The computing device of claim 13, wherein displaying the one or more user interface elements on the physical surface is also based at least on determining that the physical surface comprises a planar surface.

16. The computing device of claim 13, wherein the instructions are executable to, upon displaying the one or more user interface elements on the physical surface, display one or more additional user interface elements on the physical surface.

17. The computing device of claim 13, wherein the instructions executable to, upon displaying the one or more user interface elements on the physical surface, modify the display of at least one of the one or more user interface elements for touch input.

18. The computing device of claim 13, wherein the instructions executable to, based on receiving user input to switch a display mode, either switch the display of the one or more user interface elements from an in-air location to the physical surface, or switch the display of the one or more user interface elements from the physical surface to the in-air location.

19. The computing device of claim 13, wherein the instructions are executable by the processor to:
   determine that the physical surface comprises a touch-detecting surface; and
   based at least on determining that the physical surface comprises a touch-detecting surface, display the one or more user interface elements on the touch-detecting surface.

20. A head-mounted display device, comprising:
   a see-through display;
   a processor; and
   a memory holding instructions executable by the processor to:
      receive image data of a real world physical environment;
      display a virtual object within a real world physical environment;
      display a plurality of user interface elements with the virtual object;
      receive user input that moves the virtual object and the plurality of user interface elements;
      determine that one or more of the virtual object and the plurality of user interface elements are within a predetermined distance of a physical surface;
      determine that the physical surface has a surface area greater than a predetermined minimum surface area;
      based at least on determining that one or more of the virtual object and the plurality of user interface elements are within the predetermined distance of the physical surface, and determining that the physical surface has a surface area greater than the predetermined minimum surface area, transition the plurality of user interface elements independently from the virtual object for display on the physical surface; and
      display the plurality of user interface elements on the surface.

\* \* \* \* \*